United States Patent [19]

Hanabusa et al.

[11] Patent Number: 4,737,927
[45] Date of Patent: Apr. 12, 1988

[54] MAP DISPLAY APPARATUS

[75] Inventors: Kazunori Hanabusa, Kasugai; Yutaka Akita, Nagoya; Tetsuo Takagi; Kenzo Ito, both of Okazaki, all of Japan

[73] Assignee: Nippondenso Co., Ltd., Kariya, Japan

[21] Appl. No.: 857,173

[22] Filed: Apr. 29, 1986

[30] Foreign Application Priority Data

Apr. 30, 1985 [JP] Japan ................................. 60-94612

[51] Int. Cl.$^4$ ............................................ G06F 15/50
[52] U.S. Cl. .................................. 364/443; 364/449; 364/521; 340/990; 340/995; 73/178 R
[58] Field of Search ............... 364/443, 444, 449, 518, 364/521, 424; 340/988, 990, 995; 73/178 R

[56] References Cited

U.S. PATENT DOCUMENTS

| | | | |
|---|---|---|---|
| 4,481,584 | 11/1984 | Holland | 364/424 |
| 4,504,913 | 3/1985 | Miura et al. | 364/449 |
| 4,511,973 | 4/1985 | Miura et al. | 364/449 |
| 4,513,377 | 4/1985 | Hasebe et al. | 364/449 |
| 4,527,155 | 7/1985 | Yamaki | 340/995 |
| 4,532,514 | 7/1985 | Hatano et al. | 340/995 |
| 4,543,572 | 9/1985 | Tanaka et al. | 364/449 |
| 4,571,684 | 2/1986 | Takanabe et al. | 364/449 |
| 4,608,656 | 8/1986 | Tanaka et al. | 364/449 |
| 4,630,209 | 12/1986 | Saito et al. | 364/444 |

FOREIGN PATENT DOCUMENTS 0066397 8/1982 European Pat. Off. ............ 364/449
0119674 9/1984 European Pat. Off. .

*Primary Examiner*—Gary Chin
*Attorney, Agent, or Firm*—Cushman, Darby & Cushman

[57] ABSTRACT

A map display apparatus displays a road map of a desired display district in accordance with stored map data. The apparatus includes a map data storing medium storing, in correspondence to a plurality of basic sections forming the whole area of the road map, a plurality of map information representing the road configurations in the basic sections and a plurality of name information representing the names of various parts in the basic sections, a display selecting device for selecting the desired display district from the whole area of the road map, a display control unit for generating a display signal in accordance with the map information group and the name information group of the basic sections contained in the selected display district, and a display responsive to the display signal to display the selected display district. Thus, when displaying the map of the selected district, it is only necessary to read and display the map information and name information of the basic sections belonging to the district.

1 Claim, 8 Drawing Sheets

MAP DISPLAY APPARATUS

BACKGROUND OF THE INVENTION

1. Field of the Invention

The present invention relates to a map display apparatus and more particularly to a map display apparatus designed so that all the map data of an area to be displayed is recorded in a map data recording medium and the desired map data for display is read from the map data recording medium to display a map.

2. Description of the Prior Art

Various map display apparatus have been proposed in the past in which a road map is displayed on a display including a CRT or the like to guide the movement of a vehicle by the driver and one such apparatus is so designed that the map data of the whole area subjected to map display is preliminarily recorded in a recording medium such as a magnetic tape, magnetic disc or CD ROM and the map data presently required for display purposes is read from the recorded data thereby displaying a map on a display.

On the other hand, if a road map including the names of various parts on the map such as the names of prefectures, cities, towns, roads and intersections as in a commercially available road map is displayed on the display, the driver finds it impossible to distinguish the desired district or spot on the map while driving and the map becomes a hard-to-see map. Thus, a map display apparatus has been conceived in which a recording medium stores map data comprising map information including only the configuration, e.g., rivers, roads, railways, city streets, principal buildings, etc., and various name information indicating the names of various parts on the map in correspondence to the map information and only the desired name information is displayed on a display.

Then, when recording the map data divided into the map information and the name information, it has been the practice to simply record the map information and the name information in separate areas on the map data recording medium and therefore there are disadvantages that the whole recording medium must be searched in order to read the map data of the district required for map display and that even the mere display of the desired name requires searching of all the name information of the districts including those having no relation to the displayed map. This requires a considerable time for extracting the desired map data.

SUMMARY OF THE INVENTION

It is an object of the present invention to provide a map display apparatus designed so that the map data required for display purposes is rapidly displayed and the extraction of the name information corresponding to the desired name on the displayed map for its display is effected quickly.

To accomplish the above object, in accordance with the invention there is thus provided a map display apparatus including display means for displaying a map, a map data recording medium for storing map data including a group of map information representing the configuration of the map and a group of name information representing the name of various parts on the map in correspondence to a plurality of basic sections determined by dividing the map of the whole area to be displayed on the display means in accordance with predetermined conditions, display division selecting means for selecting a division of the map to be displayed on the display means, display name selecting means for selecting the desired name to be displayed on the map displayed on the display means, map display control means for reading from the map data recording means the map information group of the basic sections belonging to the division selected by the display division selecting means and displaying a map configuration on the display means, and name display control means for searching the name information group of the basic sections belonging to the displayed division of the map to extract the name information corresponding to the name selected by the display name selecting means and displaying the extracted name information on the map displayed on the display means.

The display means displays a map to provide a guide to the road such as the travel path of a vehicle for the driver and it may be a CRT display, liquid crystal dot-display, LED display or the like.

The map display recording medium stores the map data of the whole area to be displayed on the display means in correspondence to a plurality of basic sections determined by dividing the map to look like a network and it includes a magnetic tape, magnetic disc, CD ROM or the like. Also, the map data stored by basic sections in the map data recording medium comprises a group of map information representing the map configuration of the basic sections such as roads, rivers, railways, city streets, principal buildings, etc., and a group of name information representing the names of various parts, e.g., the names of roads, rivers, railways, places buildings, etc., on the map.

Also, the map information group may be comprised of pattern data representing the configuration of the map as such and the name information group may be provided in the form of code data including information representing the names and positions of various parts on the map. Also, the name information group may store the names of various parts on the map in the order of the katakana syllabary or in alphabetical order so that the desired name information is searched quicker than previously.

The display division selecting means selects any desired map to be displayed on the display means and it may, for example, be designed such that the position of a vehicle varying from moment to moment during the movement of the vehicle is detected so that when the vehicle moves away from a given area of the presently displayed map, the map of the division lying in the direction of movement of the vehicle is selected. Alternatively, operating means may be provided to allow the vehicle driver to select a map to be displayed so that the desired division of the displayed map is selected through the operation of the vehicle driver.

The display name selecting means is provided for the purpose of displaying the desired name information on the map displayed on the display means and it may for example be designed so that operating means is provided to allow the vehicle driver to select the desired name to be displayed by entering the desired name or its capital letter.

The map display control means and the name display control means are provided by a microcomputer including a CPU, an ROM, an RAM, etc. The map display control means reads the map information of the basic sections belonging to the division selected by the display division selecting means to display a map configuration on the display means and the name display control means displays on the display means the name information corresponding to the name selected by the display name selecting means.

In accordance with the vehicle map display apparatus of the invention constructed as described above, because the map data recording medium stores the map information and the name information in correspondence with the basic sections, when the map information of the division selected by the display division selecting means is to be read by the map display control means or when the name information selected by the display name selecting means is to be extracted by the name display control means, it is only necessary to search the area of the map data recording medium containing the map data of the basic sections belonging to the display division and the extraction of the desired map data can be effected in a short period of time. Also, when changing the name information on the displayed map, it is only necessary to search the name information in the corresponding basic sections and thus the required processing can be performed quickly.

DESCRIPTION OF THE PREFERRED EMBODIMENTS

An embodiment of the present invention will now be described with reference to the drawings.

Figure 2:
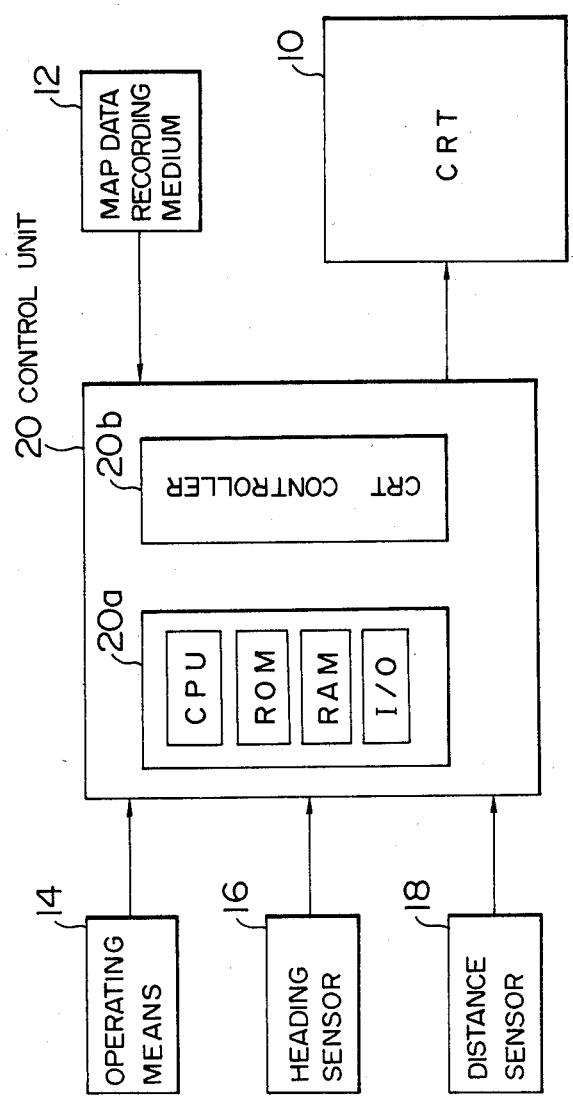
FIG. 2 is a block diagram showing the overall construction of a map display apparatus for vehicles according to an embodiment of the invention.

FIG. 2 is a block diagram showing the overall construction of a map display apparatus for vehicles according to the invention.

In the Figure, numeral 10 designates a CRT used for map displaying purposes, 12 a map data recording medium preliminarily storing map data which are to be displayed on the CRT 10, 14 operating means used by a vehicle driver or occupant to select various information for display on the CRT 10, 16 a heading sensor for detecting the heading of the vehicle in which the map display apparatus is installed, 18 a distance sensor for detecting the distance travelled by the vehicle, and 20 a control unit responsive to the signals from the operating means 14, the heading sensor 16 and the distance sensor 18 to display a map on the CRT 10.

Figure 3:
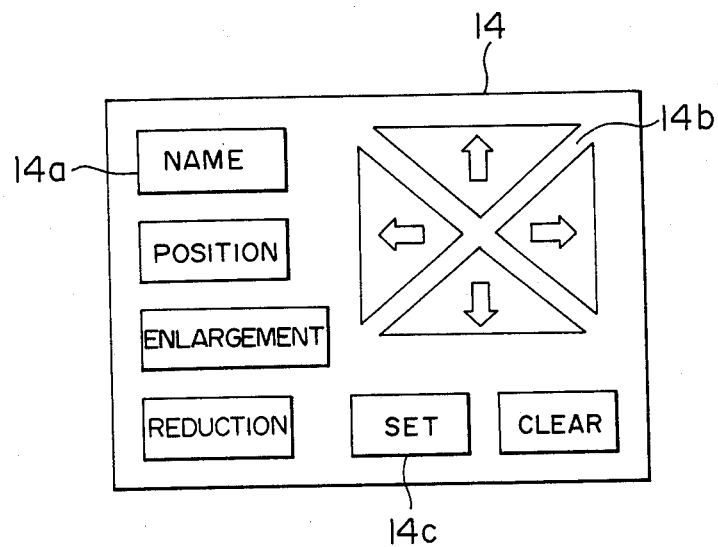
FIG. 3 is a schematic diagram showing an examplary construction of the operating means.

The operating means 14 is used to select the desired division of the map to be displayed on the CRT 10, the names of various parts to be displayed on the map, etc., enter the position of the vehicle on the displayed map and select various information such as the enlargement or reduction of the displayed map which the vehicle driver desires to display on the CRT 10 and it includes for example a plurality of operating keys as shown in FIG. 3. The heading sensor 16 includes a ring-shaped permalloy core, an exciting coil and a pair of coils arranged to intercross at right angles so that the direction of movement of the vehicle with respect the earth's magnetic field is detected on the basis of the output voltages of the two coils. The distance sensor 18 includes a reed switch, magnetoresistance element, photoelectric conversion element or the like to detect the rotation of the speedometer cable or the transmission output shaft as an electric signal. It is to be noted that the operating means 14, the heading sensor 16 and the distance sensor 18 correspond to the display division selecting means M3 shown in FIG. 1 and the operating means 14 also corresponds to the display name selecting means M4 of FIG. 1.

Figure 4:
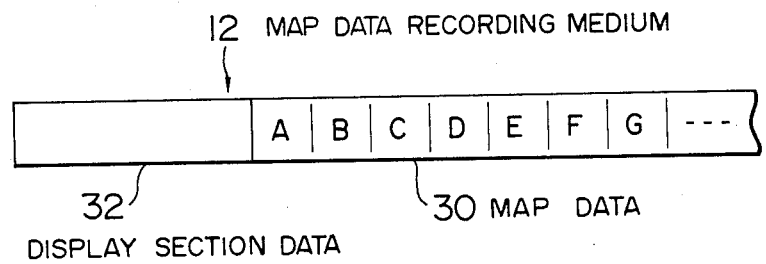
FIG. 4 is a diagram showing the structure of the data recorded in the map data recording medium.

The map data recording medium 12 forms the principal part of the invention and in this embodiment it includes a CD ROM in which is successively recorded map data 30 corresponding to basic sections determined by dividing the map of the whole area to be displayed so as to look like a network and display section data 32 including the preset numbers of the basic sections belonging to the district according to the administrative divisions such as prefectures, cities, towns, etc., as shown in FIG. 4.

Figure 5:
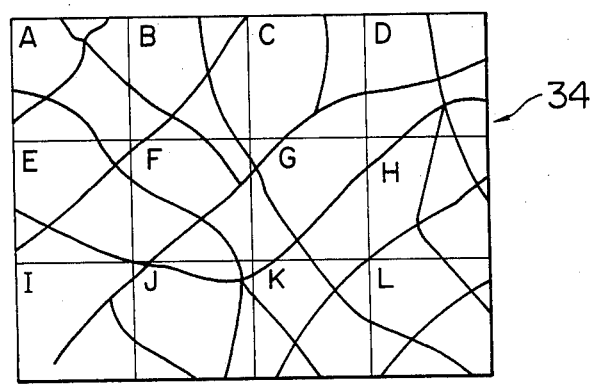
FIG. 5 is a diagram for explaining the basic sections.
Figure 6:
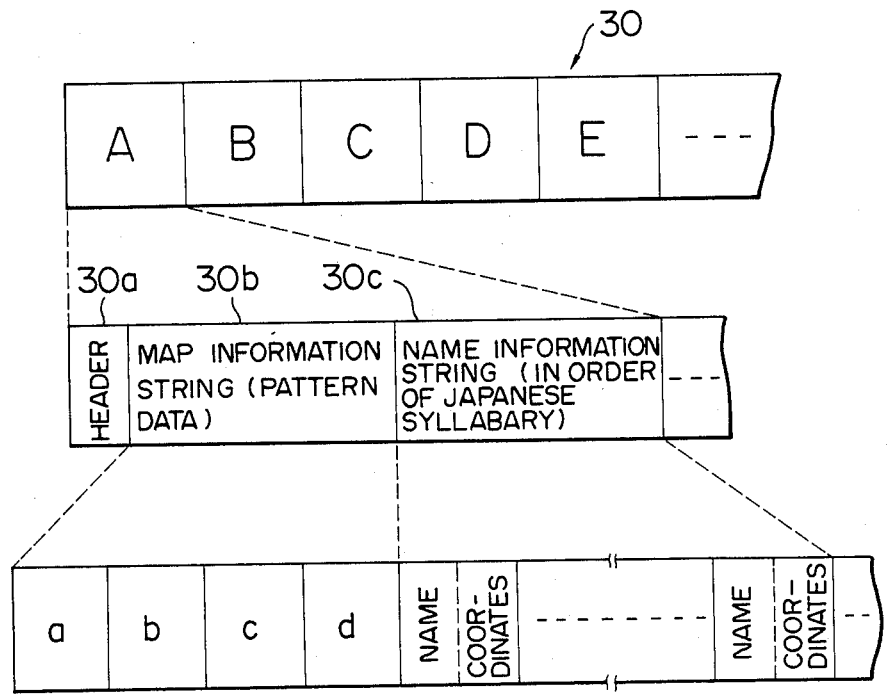
FIG. 6 is a diagram showing the structure of the map data.
Figure 7:
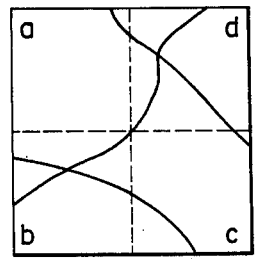
FIG. 7 is a diagram showing the subsections of the basic section.
Figure 8:
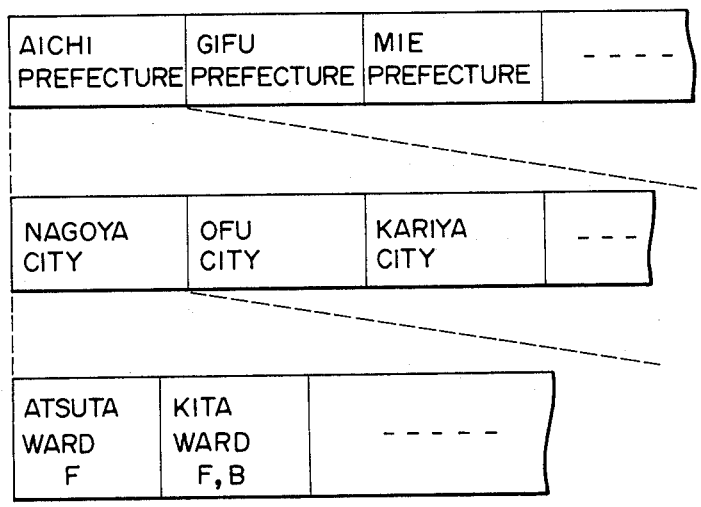
FIG. 8 is a diagram showing the structure of the display section data.

The map data 30 includes map data recorded sucessively in correspondence to basic sections A, B, C,—determined by dividing a map 34 of the whole area to be displayed on the CRT 10 in the form of a network as shown in FIG. 5 and each of the map data of the basic sections A, B, C,—includes, as shown in FIG. 6, a header 30a representing the identification code of the basic section, a map information string 30b representating the map configuration of the basic section such as roads, rivers, railways, city streets and principal buildings and a name information string 30c including the names of various parts on the map and the coordinates indicating the positions of these parts which are both recorded in the order of the katakana syllabary as in a dictionary. Also, the map information string 30b is stored in the form of pattern data recorded in correspondence to subsections a, b, c, d determined by dividing each of the basic sections A, B, C,—into four parts as shown in FIG. 7.

The display section data 32 includes the numbers (i.e., A, B, C,—)of the basic sections belonging to the district in correspondence to a hierarchy structure in which the map to be displayed is divided hierarchically on the basis of prefectures, municipalities, etc., and these numbers are recorded on the basis of the smallest administrative sections.

Figure 1:
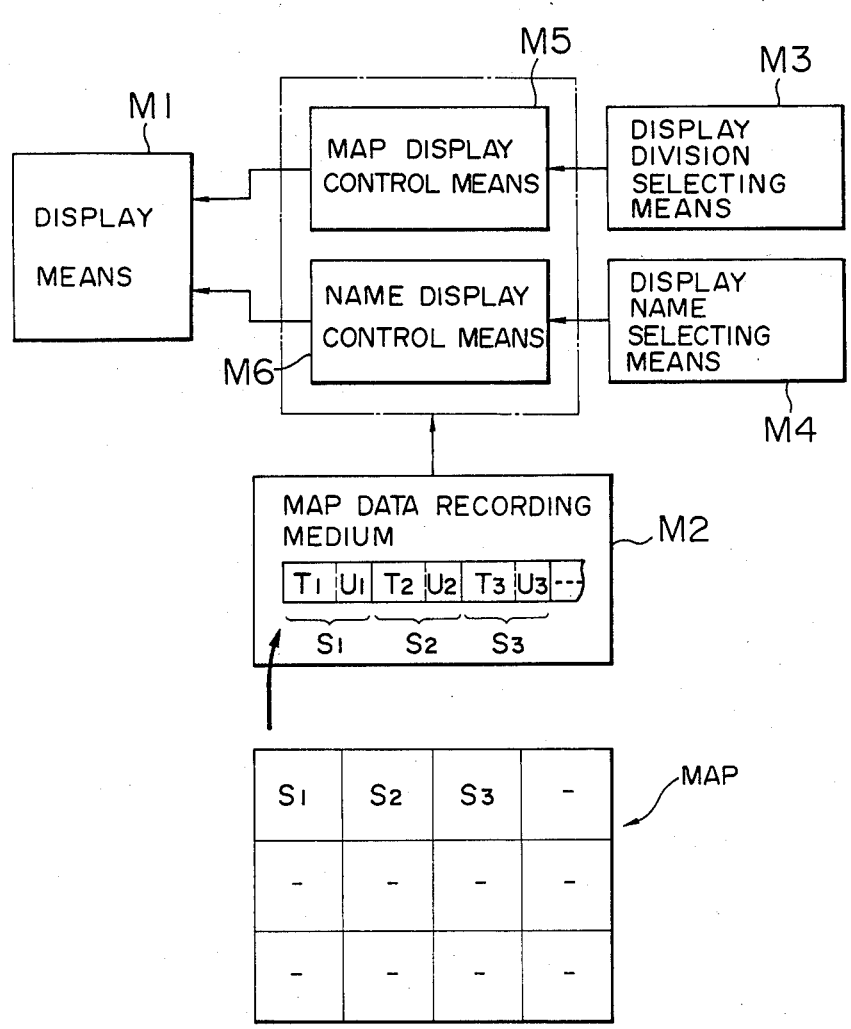
FIG. 1 is a block diagram showing the construction of the invention.

The control unit 20 corresponds to the map display control means M5 and the name display control means 6 shown in FIG. 1 and it includes a microcomputer 20a including a CPU, ROM, RAM, I/O ports and the like and a CRT controller 20b for displaying map information on the CRT 10. The control unit 20 performs a series of map display processing steps of i.e. selecting the map of a division selected by the vehicle occupant, displaying the present position of the vehicle on the displayed map and it also performs a processing step for displaying the names of specified parts on the displayed map in accordance with a selection of the vehicle occupant. The map display processing and the name display processing performed by the control unit 20 will now be described.

Figure 9:
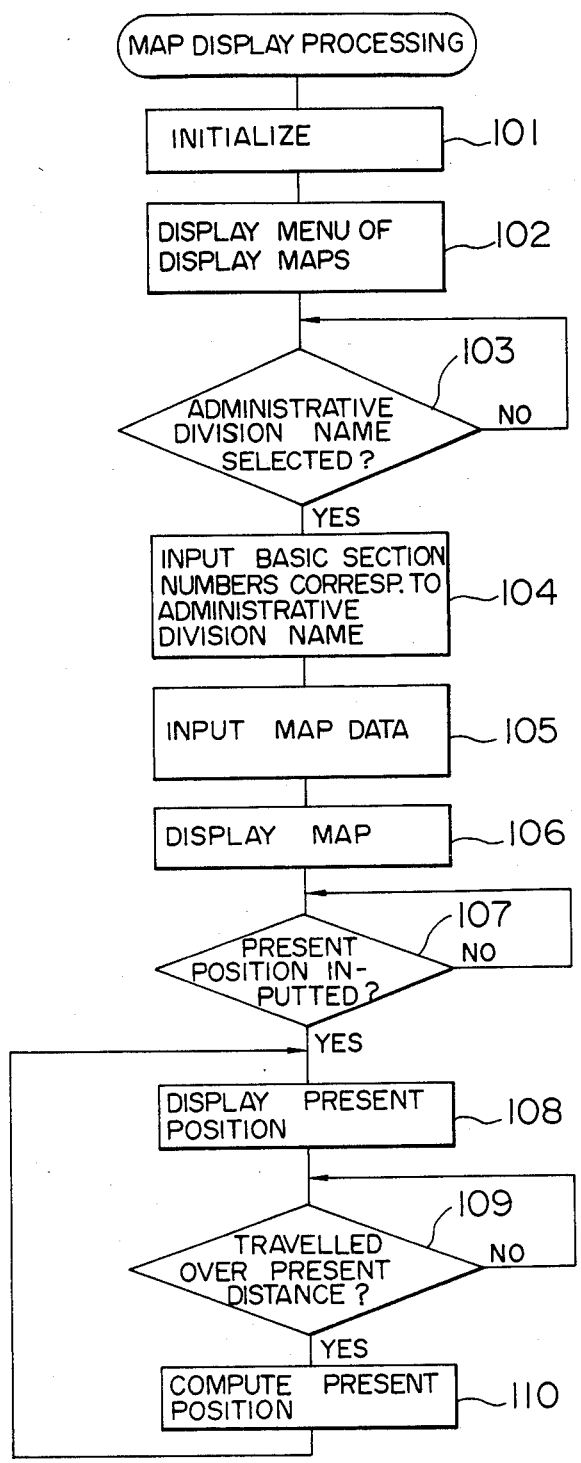
FIG. 9 is a flow chart showing the map display processing.

Referring to FIG. 9, there is illustrated a flow chart showing the map display processing. After the processing has been started, as shown in the Figure, an initialization is performed at a step 101 and a transfer is made to a step 102. At the step 102, a display map menu display is performed so that the administrative division names included in the display section data 32 are displayed on the CRT 10 and the vehicle occupant is allowed to select the desired map division to be displayed. Then, a transfer is made to a step 103 where it is determined whether the desired administrative division names have been selected by the vehicle occupant through the operation of the operating means 14. If the administrative division names have been selected, a transfer is made to a step 104.

At the step 104, the basic section numbers corresponding to the map data of the selected administrative division names are inputted from the display division data 32 and a transfer is made to step 105. At the step 105, the map data of the basic sections corresponding to the inputted basic section numbers are inputted from the map data recording medium 12 and a transfer is made to a step 106 where the map corresponding to the map information inputted from the map data is displayed on the CRT 10.

Then, at a step 107, it is determined whether the position of the vehicle on the map displayed on the CRT 10 has been entered by the vehicle occupant. If the present position has been entered, a transfer is made to a step 108 so that the present position is displayed on the CRT 10.

At a step 109, whether the vehicle has traveled over a predetermined distance from the present position displayed on the CRT 10 is determined in accordance with the distance signal generated from the distance sensor 18. If it is determined that the vehicle has traveled over the predetermined distance, a transfer is made to the following step 110 so that the present position is computed in accordance with the heading signal generated from the heading sensor 16 during the driving of the vehicle and a return is made to the step 108.

As a result of the map display processing performed in the above-mentioned manner, a map containing the administrative division selected by the vehicle occupant is displayed on the CRT 10. In other words, if the city of Nagoya has been selected by the vehicle occupant, the map data of all the basic sections containing the map data of Nagoya city are inputted at the step 105 and a map showing the city of Nagoya and its surroundings is displayed on the CRT 10 through the operation of the step 106. After the present position of the vehicle has been displayed on the map, the vehicle position varying with the movement of the vehicle is successively displayed thus allowing the vehicle occupant to know the present position.

Figure 10:
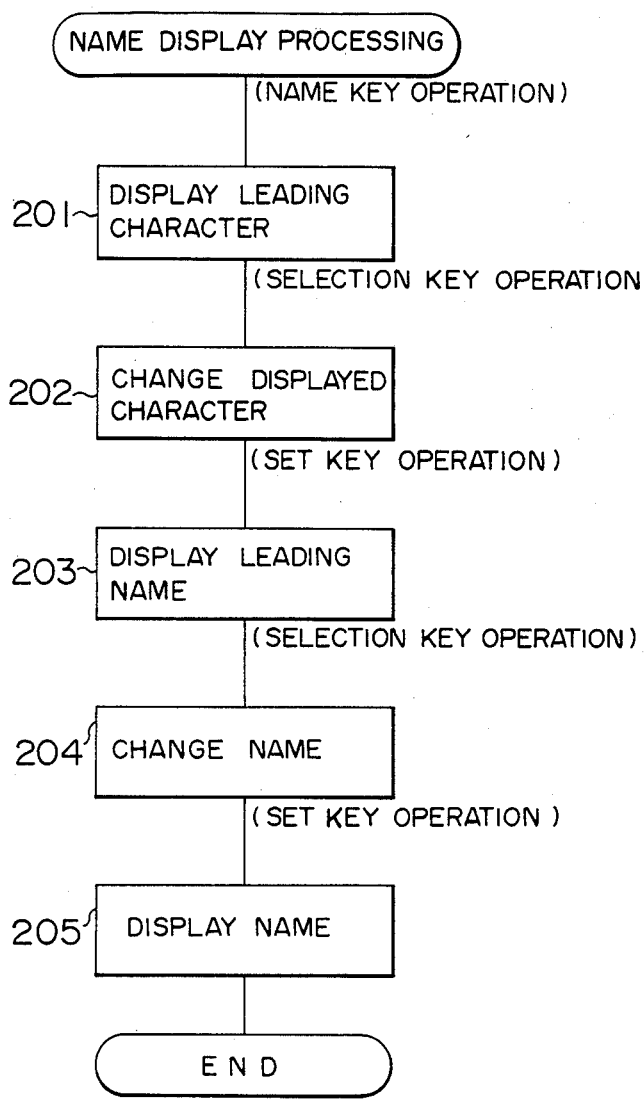
FIG. 10 is a flow chart showing the name display processing.

The name display processing has the purpose of displaying the names selected through the operation of the operating means 14 by the vehicle occupant on the CRT 10 and it is pefromed as shown in FIG. 10.

More specifically, when a name key 14a of the operating means 14 shown in FIG. 3 is operated by the vehicle occupant, a step 201 is performed so that the leading character (ぁ) of the name information recorded at the top of the name information string 30c is displayed in a given area of the CRT 10. Then, as a selection key 14b is operated by the vehicle occupant, a step 202 is performed and the displayed character is changed in the order of the katakana syllabary.

Figure 11:
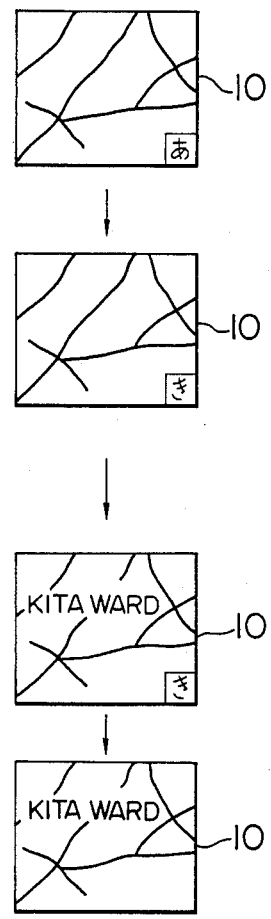
FIG. 11 shows the manner in which the picture on the CRT is changed in accordance with the processings of FIGS. 9 and 10.

Then, when a set key 14c is operated, a step 203 is performed so that the name at the top of the name information belonging to the presently displayed leading character is displayed on the map in accordance with its coordinates. Then, in response to the operation of the selection key 14b by the vehicle occupant, a step 204 is performed and the name displayed on the map is successively changed. Then, the set key 14c is operated so that the displayed name is continuously displayed as such and the processing is completed temporarily. FIG. 11 shows the changes made in the displayed picture on the CRT 10 by the above-mentioned processing.

As described hereinabove, in accordance with the map display apparatus for vehicles according to the invention, the map data of the whole area to be displayed on the CRT 10 is recorded in correspondence to the basic sections determined by dividing the map of the whole area to look like a network and the map data of each basic section includes map information showing its configuration and name information showing the names of its various parts. Thus, it is possible to display only the desired names on the map displayed on the CRT 10 and the name information is recorded in pairs with the map information on the CRT 10 in the order of the katakana syllabary thus making it possible to search the desired name information quickly.

Figure 12:
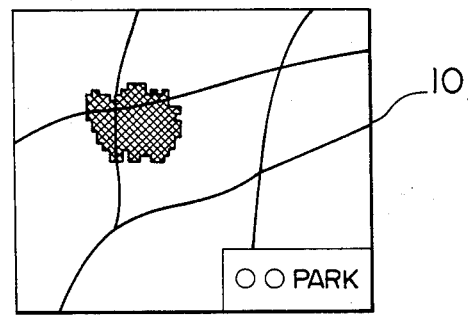
FIG. 12 illustrates a picture for explaining a name display method different from that used in the first embodiment.

While, in this embodiment, the name information includes the names of various parts on the basic sections and the coordinates representing their positions so that when displaying the desired names on the map the desired names are displayed as such on the map on the basis of the coordinates, if, for example, the name information includes the name of a place showing a given part or a building, the name information may for example be comprised of a group of coordinates representing the part as a whole and its name so that the name is displayed in a given area on the CRT 10 and the whole part is discriminated and displayed in mosaic form in accordance with the coordinate group as shown in FIG. 12.

As described hereinabove in detail, in the map display apparatus of this invention, the map data of a whole area to be displayed is recorded in a map data recording medium in correspondence to a plurality of basic sections determined by dividing the map of the area in accordance with given conditions and the map data of the basic sections includes map information showing the map configuration and name information showing various names on the map. Thus, when displaying the map of a division selected by display division selecting means, it is necessary to read only the map information of the basic sections belonging to the division and there is no need to search all the map data. Also, it is possible to display only the desired name information selected by display name selecting means on the displayed map and there is no danger of the map becoming indistinct. Further, when extracting the desired name information from the map data recording medium, it is only necessary to search the name information group in the division of the map displayed on display means and therefore this operation can be performed more quickly than previously.

What is claimed is:

1. A map display apparatus for displaying a desired display area of a road map which is divided into a plurality of basic sections, said apparatus comprising:

a map data storing means for successively storing, for each of said plurality of basic sections, map information representing a road configuration in said basic section and name information representing names of at least one of a road and a place in said basic section;

display area selecting means for selecting said desired display area from the whole area of said road map;

display name selecting means for selecting for displaying desired names in said display area;

display control means for generating display signals representing a desired map in accordance with the map information and the name information of the basic sections contained in said display area selected by said display selecting means and said display name selecting means; said display control means including:

map display control means for reading the map information of the basic sections belonging to said display area selected by said display selecting means to generate the display signal, and name display control means for searching the name information of the basic sections belonging to said display area and extracting the name information corresponding to said desired names slected by said display name selecting means to generate the display signal; and display means responsive to said display signals from said display control means to display said selected display area.

* * * * *